United States Patent
Kamata

(10) Patent No.: US 10,339,204 B2
(45) Date of Patent: Jul. 2, 2019

(54) CONVERTING ELECTRONIC DOCUMENTS HAVING VISIBLE OBJECTS

(71) Applicant: Konica Minolta Laboratory U.S.A., Inc., San Mateo, CA (US)

(72) Inventor: Takayuki Kamata, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 22 days.

(21) Appl. No.: 15/417,340

(22) Filed: Jan. 27, 2017

(65) Prior Publication Data

US 2017/0139875 A1    May 18, 2017

Related U.S. Application Data

(63) Continuation of application No. 14/042,605, filed on Sep. 30, 2013, now Pat. No. 9,589,067.

(51) Int. Cl.
| | |
|---|---|
| *G06F 17/21* | (2006.01) |
| *G06F 16/178* | (2019.01) |
| *G06F 16/84* | (2019.01) |
| *G06F 16/93* | (2019.01) |
| *G06F 16/11* | (2019.01) |
| *G06F 17/22* | (2006.01) |
| *G06F 17/24* | (2006.01) |

(52) U.S. Cl.
CPC .......... *G06F 17/211* (2013.01); *G06F 16/116* (2019.01); *G06F 16/1794* (2019.01); *G06F 16/88* (2019.01); *G06F 16/93* (2019.01); *G06F 17/2247* (2013.01); *G06F 17/2264* (2013.01); *G06F 17/246* (2013.01)

(58) Field of Classification Search
CPC .......................... G06F 17/211; G06F 17/2247
See application file for complete search history.

(56) References Cited

U.S. PATENT DOCUMENTS

| | | | |
|---|---|---|---|
| 7,653,876 B2 | 1/2010 | Ethier et al. | |
| 8,830,241 B1* | 9/2014 | Gorner | G06K 9/34 345/467 |
| 2004/0181748 A1* | 9/2004 | Jamshidi | G06F 17/2247 715/239 |
| 2004/0199876 A1* | 10/2004 | Ethier | G06F 17/218 715/249 |
| 2007/0162840 A1 | 7/2007 | Rochelle et al. | |
| 2007/0250764 A1* | 10/2007 | Jiang | G06F 17/2247 715/212 |
| 2013/0262987 A1 | 10/2013 | Tang et al. | |

(Continued)

*Primary Examiner* — Scott T Baderman
*Assistant Examiner* — Seung Woon Jung
(74) *Attorney, Agent, or Firm* — Osha Liang LLP

(57) ABSTRACT

A method involves managing electronic documents (EDs). The method includes receiving a first request to convert an original ED including a visible object from a first format to a second format; extracting, in response to the first request, multiple attributes in the original ED specifying the visible object and required to restore the visible object in the first format; generating, by converting the original ED from the first format to the second format, a converted ED including rendering data of the visible object that is grammatically native to the second format and that is necessary to render the visible object from the second format; and embedding the attributes extracted from the original ED into metadata of the converted ED.

12 Claims, 7 Drawing Sheets

(56) References Cited

U.S. PATENT DOCUMENTS

2014/0033069 A1\* 1/2014 Chegini ............... G06Q 10/10
715/751
2014/0215302 A1\* 7/2014 Little ............... G06F 17/30893
715/229

\* cited by examiner

FIG. 3C

CONVERTING ELECTRONIC DOCUMENTS HAVING VISIBLE OBJECTS

CROSS-REFERENCE TO RELATED APPLICATIONS

This application is a continuation application of U.S. patent application Ser. No. 14/042,605, that filed on Sep. 30, 2013. Accordingly, this application claims benefit of U.S. patent application Ser. No. 14/042,605 under 35 U.S.C. §120. U.S. patent application Ser. No. 14/042,605 is hereby incorporated by reference in its entirety.

BACKGROUND

An electronic document (ED) often includes one or more visible objects. A visible object is an object that is created and visible to the user when the ED is rendered (i.e., displayed, printed, etc.). Example visible objects include, but are not limited to, equation objects, spreadsheet cells, and shapes. The ED includes one or more attributes specifying/describing the visible object. These attributes are needed to create the visible object. Moreover, these attributes are specific to the format of the ED.

It is not uncommon for a user to request an ED be converted from an old format or a first format to a new format or a second format. Although conversion is possible, the conversion process often discards/loses one or more of the attributes. Accordingly, if the user (or a different user) ever requests the ED be reconverted from the new format back to the old format, the visible object(s) in the unconverted ED might not appear the same as it did prior to any conversion. This interferes with the user's viewing experience. Regardless, users still wish to convert EDs having visible objects.

SUMMARY

In general, in one aspect, the invention relates to a method for managing electronic documents (EDs). The method comprises: receiving a first request to convert an original ED comprising a visible object from a first format to a second format; extracting, in response to the first request, a plurality of attributes in the original ED specifying the visible object and required to restore the visible object in the first format; generating, by converting the original ED from the first format to the second format, a converted ED comprising rendering data of the visible object that is grammatically native to the second format and that is necessary to render the visible object from the second format; and embedding the plurality of attributes extracted from the original ED into metadata of the converted ED.

In general, in one aspect, the invention relates to a method for managing electronic documents (EDs). The method comprises: receiving a request to convert a converted ED to a first format from a second format; identifying, during a parsing of the converted ED triggered by the request, rendering data of a visible object that is grammatically native to the second format and that is necessary to render the visible object from the second format; locating, in response to identifying the rendering data of the visible object, a plurality of attributes required to restore the visible object in the first format within metadata of the converted ED; and generating, by converting the converted ED from the second format to the first format, an unconverted ED comprising the visible object restored using the plurality of attributes extracted from the metadata.

In general, in one aspect, the invention relates to a non-transitory computer readable medium (CRM) storing instructions for managing electronic documents (EDs). The instructions comprising functionality for: receiving a first request to convert a converted ED to a first format from a second format; identifying, during a parsing of the converted ED triggered by the first request, rendering data of a visible object that is grammatically native to the second format and that is necessary to render the visible object from the second format; locating, in response to identifying the rendering data of the visible object, a plurality of attributes required to restore the visible object in the first format within metadata of the converted ED; and generating, by converting the converted ED from the second format to the first format, an unconverted ED comprising the visible object restored using the plurality of attributes extracted from the metadata.

In one aspect, a system for managing electronic documents (EDs). The system comprises: a processor; a buffer configured to store an original ED comprising a plurality of attributes specifying a visible object and required to restore the visible object in a first format; an extractor configured to extract the plurality of attributes from the original ED; a conversion engine executing on the processor and configured to generate a converted ED comprising rendering data of the visible object by converting the original document from the first format to a second format, wherein the rendering data is grammatically native to the second format and necessary to render the visible object from the second format; and an embedding engine configured to embed the plurality of attributes extracted from the original ED into metadata of the converted ED.

Other aspects of the invention will be apparent from the following description and the appended claims.

BRIEF DESCRIPTION OF DRAWINGS

FIG. 3A, FIG. 3B, and FIG. 3C show examples in accordance with one or more embodiments of the invention.

DETAILED DESCRIPTION

Figure 1:
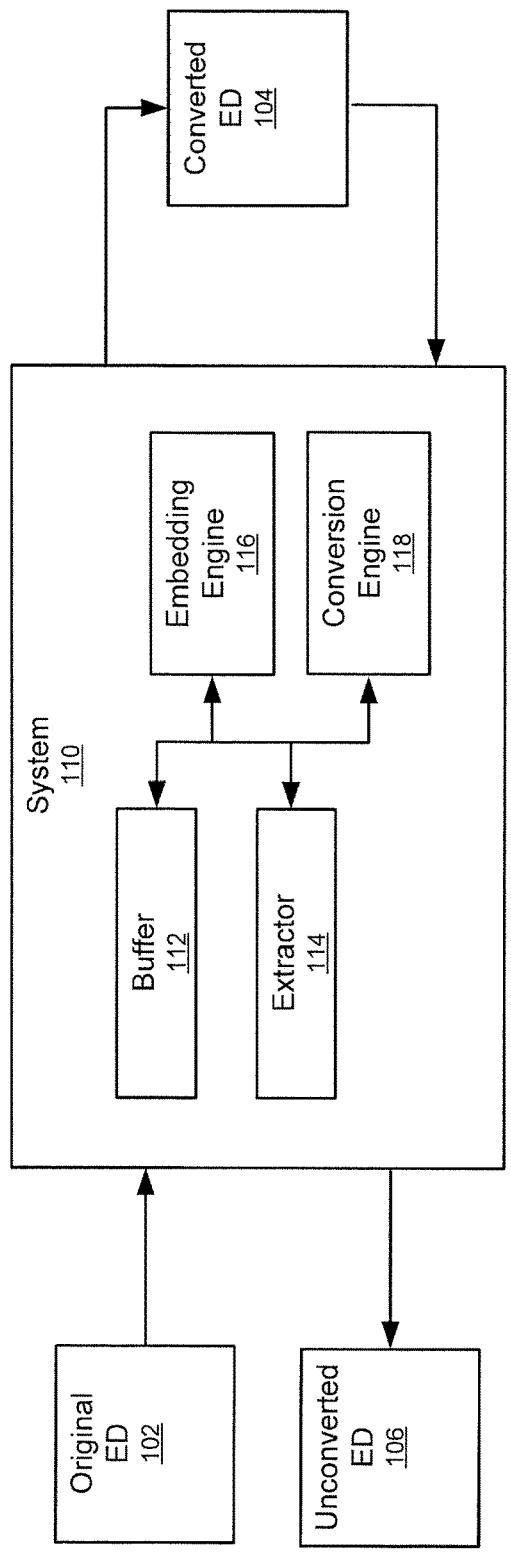
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing EDs. Following a request to convert an original ED having a visible object from a first format to a second format, the attributes in the original ED specifying the visible object are extracted. These attributes may be used in the future to restore (i.e., recreate) the visible object in the first format. Then, a converted ED is generated by converting the original ED from the first format to the second format. The converted ED may include metadata and rendering data that is grammatically native to the second format and is necessary to render an image of the visible object. The previously extracted attributes are embedded in the metadata of the converted ED. For example, the extracted attributes may be embedded in metadata within an invisible layer of the converted ED. If a request is later received to convert the converted ED from the second format back to the first format, an unconverted ED will be generated by converting the converted ED from the second format back to the first format. The attributes will subsequently be located in the metadata of the converted ED, and then used to restore the original object in the first format for the unconverted ED.

FIG. 1 shows a system (110) in accordance with one or more embodiments of the invention. As shown in FIG. 1, the system (110) has multiple components including a buffer (112), an extractor (114), a conversion engine (118), and an embedding engine (116). Each of these components (112, 114, 116, 118) may be located on the same hardware device (e.g., personal computer (PC), a desktop computer, a mainframe, a server, a telephone, a kiosk, a cable box, a personal digital assistant (PDA), an electronic reader, a smart phone, a tablet computer, etc.) or may be located on difference hardware devices connected using a network having wired and/or wireless segments. In one or more embodiments of the invention, the system (110) inputs the original ED (102) and outputs the converted ED (104). In one or more embodiments of the invention, the system (110) inputs the converted ED (104), and outputs the unconverted ED (106).

In one or more embodiments of the invention, the original ED (102) includes one or more visible objects to be displayed/printed on or across one or more pages. A visible object is an object that is created and visible to the user when the original ED (102) is rendered (i.e., displayed, printed, etc.). Example visible objects include, but are not limited to, equation objects, spreadsheet cells, and shapes. The original ED (102) includes one or more attributes specifying/describing the visible object. In the case of spreadsheet cells, these attributes may include the number of rows, the number of columns, the sizes of the cells, the functions/equations in the cells that calculate the value of each cell, etc. In the case of a shape, the attributes may include glow, shadow, and reflection values, etc. In the case of an equation object, the attributes may include the parameters/variables in the equation, the operators, etc. These attributes are needed to create the visible object. Moreover, these attributes are specific to the format of the original ED (102).

In one or more embodiments of the invention, the original ED (102) is represented/defined using a document markup language (e.g., open document format (ODF), office open XML (OOXML), etc.). Accordingly, the attributes of the visible object(s) in the original ED (106) may be recorded within the tags of the document markup language.

In one or more embodiments of the invention, the converted ED (104) is the original. ED (102) in a different format. For example, the converted ED (104) may be in the portable document format (PDF). The converted ED (104) is generated by converting the original ED (102) from its initial format (e.g., OOXML) to a new format (e.g., PDF).

In one or more embodiments of the invention, the converted ED (104) includes rendering data that is necessary to render an image of the visible object in the original ED (102). When the converted ED (104) is rendered (i.e., printed, displayed, etc.), the visible object is not created from the attributes. Instead, the existing rendering data of the visible object is used to render the converted ED (104).

In one or more embodiments of the invention, the converted ED (104) includes metadata embedded with the attributes of the visible object (104) extracted from the original ED (102) (discussed below). However, these embedded attributes are not needed to render the converted ED (104).

As discussed above, the converted ED (104) may be in the PDF. In such embodiments, the converted ED (104) may include both a visible layer that will be visible to the user when the converted ED (104) is rendered, and an invisible layer that is not visible to the user when the converted ED (104) is rendered. The rendering data of the visible object may be located within the visible layer. The metadata embedded with the attributes of the visible object may be located within the invisible layer. In one or more embodiments of the invention, the visible layer and the invisible layer overlap, and the attributes of the visible object are located directly above or directly below the rendering data of the visible object.

In one or more embodiments of the invention, the unconverted ED (106) is the converted ED (104) in the same format as the original ED (102) (e.g., OOXML). The unconverted ED (106) is generated by converting the converted ED (104) from its format (e.g., PDF), to the format of the original ED (102) (i.e., OOXML). Like the original ED (102), the unconverted ED (106) includes the attributes of the visible object, and these attributes are used to create the visible object when the unconverted ED (106) is rendered. In other words, the unconverted ED (106) includes the visible object restored in the first format using the plurality of attributes from the metadata of the converted ED (104) (discussed below).

In one or more embodiments of the invention, the system (110) includes the buffer (112). The buffer (112) may correspond to any type of memory or long-term storage (e.g., hard drive) and may be of any size. In one or more embodiments of the invention, the original ED (102) is stored in the buffer (112) following a request to convert the original ED (102) from a first format (e.g., OOXML) to a second format (e.g., PDF). In one or more embodiments of the invention, the converted ED (104) is stored in the buffer (112) following a request to convert the converted ED (104) from the second format to the first format.

In one or more embodiments of the invention, the system (110) includes the extractor (114), which may be a software module stored in a memory of the system such as a Read Only Memory (ROM), a Hard Disk Drive (HDD), and so on, and executed by a processor of the system, such as a Central Processing Unit (CPU), Micro Processing Unit (MPU), and so on. The extractor (114) is configured to identify (e.g., via parsing) visible objects in the original ED (102) while the original ED (102) is stored in the buffer (112). The extractor (114) is further configured to extract the attributes of the visible objects. Extraction does not required removal of the attributes from the original ED (102). Instead, extraction may correspond to the recording of attributes that are present in the original ED (102) and the values of the attributes. In one or more embodiments of the invention, the extractor (114) includes a list with standard visible objects and their attributes that can be compared against the original ED (102) to identify attributes for extraction.

In one or more embodiments of the invention, the extractor (114) is configured to identify (e.g., via parsing) rendering data of each visible object in the converted ED (104) while the converted ED (104) is stored in the buffer (112). The extractor (114) is further configured to then locate the attributes corresponding to each visible object in the metadata of the converted image (104). As discussed above, the rendering data of each of the visible objects may be located within a visible layer of the converted ED (104), while the attributes of each of the visible objects may be located above or below the corresponding rendering data in the invisible layer of the converted ED (104).

In one or more embodiments of the invention, the system (110) includes the conversion engine (118), which may be a software module stored in the memory and executed by the processor. The conversion engine (118) is configured to generate the converted ED (104) by converting the original ED (102) from its format (e.g., OOXML) to a different format (e.g., PDF). The conversion process may include generating rendering data of the visible objects in the original ED (102) for inclusion in the converted ED (104). The rendering data of each visible image may be grammatically native to the different format. As discussed above, the rendering data may be used to render the converted ED (104).

In one or more embodiments of the invention, the conversion engine (118) is configured to generate the unconverted ED (106) from the converted ED (104). The conversion process may include restoring (i.e., recreating) visible objects in the first format using the attributes extracted from the metadata of the converted ED (104).

In one or more embodiments of the invention, the system (110) includes the embedding engine (116), which may be a software module stored in the memory and executed by the processor. The embedding engine (116) is configured to embed visible object attributes extracted from the original ED (102) into the metadata of the converted ED (104). As discussed above, the converted ED (104) may include two overlapping layers: a visible layer with the rendering data of the visible objects and an invisible layer with the metadata thereof. The embedding engine (116) may embed the attributes of a visible object with the metadata immediately above the rendering data of the visible object (if the invisible layer is above the visible layer), or below the rendering data of the visible object (if the invisible layer is below the visible layer).

Figure 2A:
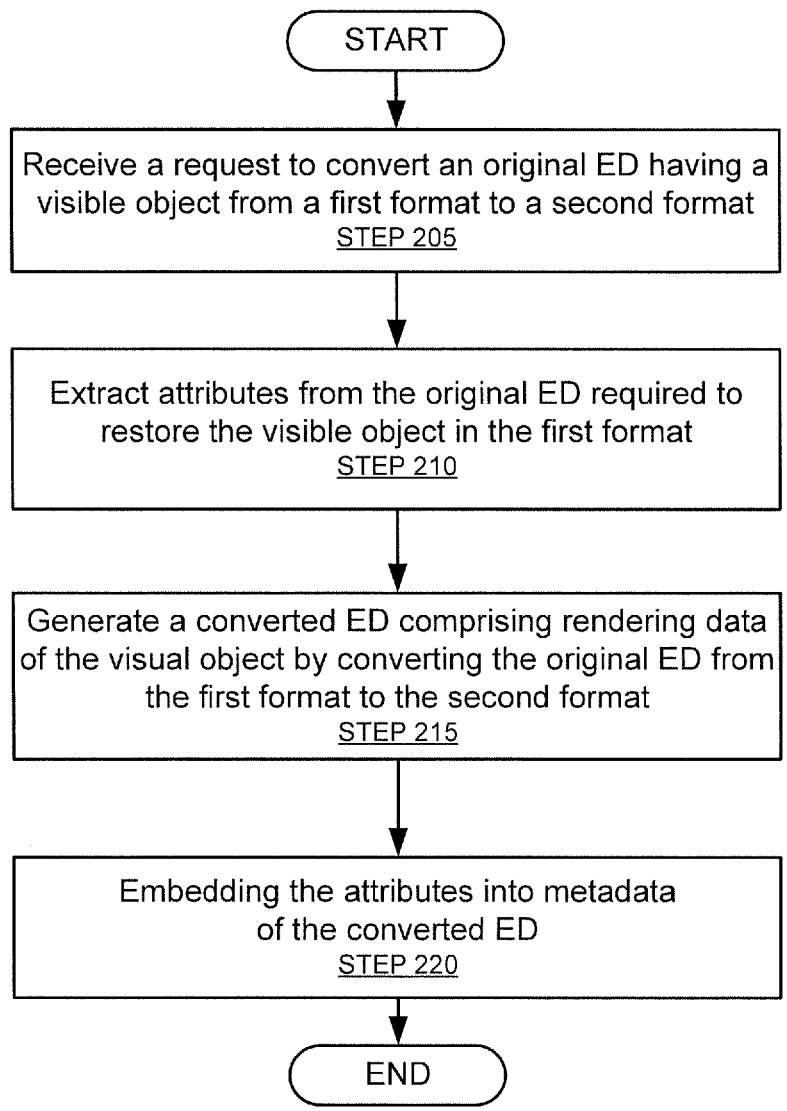
FIG. 2A and FIG. 2B show flowcharts in accordance with one or more embodiments of the invention.

FIG. 2A shows a flowchart in accordance with one or more embodiments of the invention. The process shown in FIG. 2A may be executed, for example, by one or more components (e.g., extractor (114), embedding engine (116), conversion engine (118)) discussed above in reference to FIG. 1. In case the one more components are configured as software modules, the computer program codes are stored in the memory of the system (110), and the process is carried out by the processor's reading out the program codes and executing the codes. One or more steps shown in FIG. 2A may be omitted, repeated, and/or performed in a different order among different embodiments of the invention. Accordingly, embodiments of the invention should not be considered limited to the specific number and arrangement of steps shown in FIG. 2A.

Initially, a request to convert an original ED from a first format to a second format is received (STEP 205). The request may be received from a user or from an executing software application. As discussed above, the original ED includes one or more visible objects to be displayed/printed on or across one or more pages. As also discussed above, the first format may be the document markup language OOXML, and the second format may be PDF.

In STEP 210, the attributes specifying the visible object are extracted from the original ED. As discussed above, a visible object is an object that is created from attributes specified in the original ED when the original ED is rendered (i.e., displayed, printed, etc.). Accordingly, these attributes may be used in the future to restore (i.e., recreate) the visible object in the first format. The visible object and its attributes may be identified during a parsing of the original ED triggered by the request (STEP 205). Moreover, extraction need not require removal of the attributes from the original ED. Instead, extraction may correspond to the recording of visible object(s) and its attributes that are present in the original ED and the values of the attributes. In one or more embodiments of the invention, there exists a list with standard visible objects and their attributes that can be compared against the original ED to identify attributes for extraction.

In STEP 215, a converted ED is generated. The converted ED is generated by converting the original ED from the first format (e.g., OOXML) to the second format (e.g., PDF). The conversion process may include generating rendering data of the visible objects in the original ED for inclusion in the converted ED. When the converted ED is rendered (i.e., printed, displayed, etc.), the visible object is not created from the attributes. Instead, the existing rendering data of the visible object is used to render the converted ED.

In STEP 220, the attributes extracted from the original ED (STEP 210) are embedded in metadata of the converted ED. As discussed above, the converted ED may be in the PDF. In such embodiments, the converted ED may include both a visible layer that will be visible to the user when the converted ED is rendered, and an invisible layer that is not visible to the user when the converted ED is rendered. The rendering data of the visible object may be located within the visible layer. The metadata embedded with the attributes of the visible object may be located within the invisible layer. However, the embedded attributes are not needed to render the converted ED. In one or more embodiments of the invention, the visible layer and the invisible layer overlap, and the attributes of the visible object are located directly above or directly below the rendering data of the visible object.

Figure 2B:
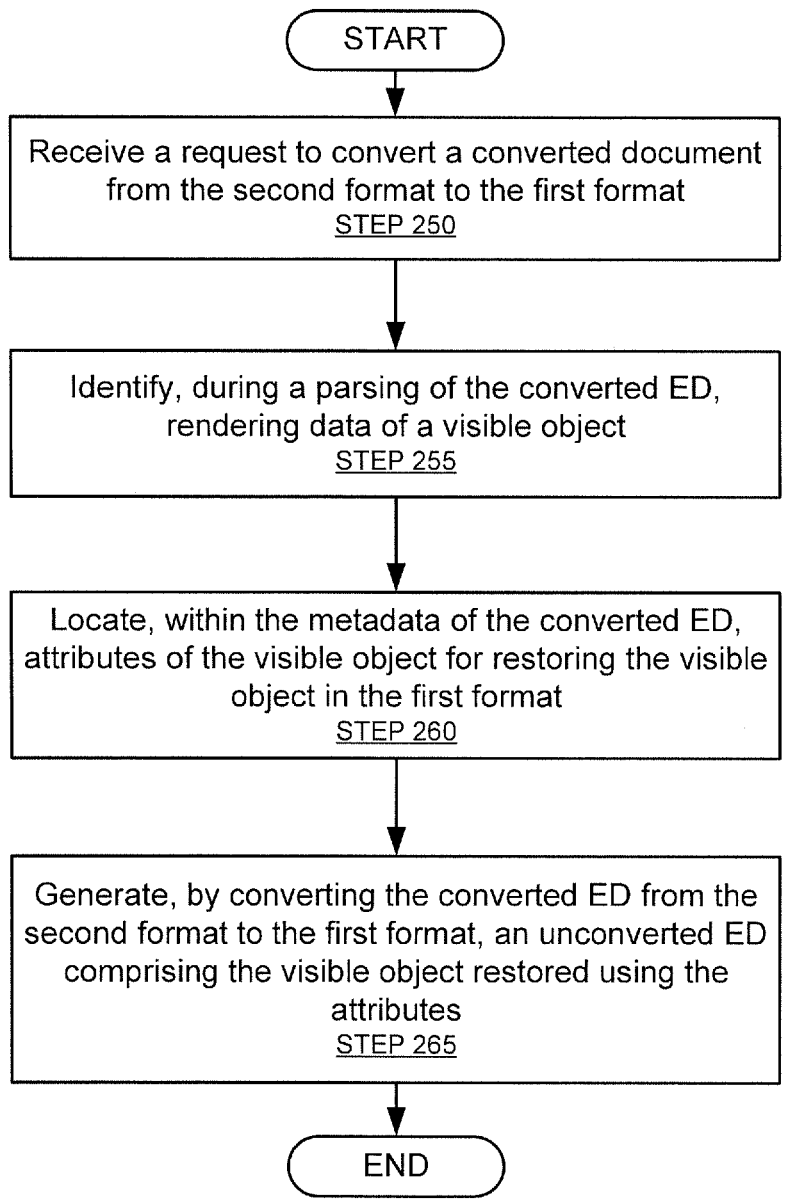

FIG. 2B shows a flowchart in accordance with one or more embodiments of the invention. The process shown in FIG. 2A may be executed, for example, by one or more components (e.g., extractor (114), embedding engine (116), conversion engine (118)) discussed above in reference to FIG. 1. In case the one more components are configured as software modules, the computer program codes are stored in the memory of the system (110), and the process is carried out by the processor's reading out the program codes and executing the codes. One or more steps shown in FIG. 2B may be omitted, repeated, and/or performed in a different order among different embodiments of the invention. Accordingly, embodiments of the invention should not be considered limited to the specific number and arrangement of steps shown in FIG. 2B. One or more of the steps in FIG. 2B may be executed at some future point after STEP 220 in FIG. 2A.

Initially, a request to convert a converted document from the second format to the first format is received (STEP 250). The request may be received from a user or from an executing software application. As discussed above, the first format may be the document markup language OOXML, and the second format may be PDF.

In STEP 255, rendering data of a visible object is identified within the converted ED. The rendering data of the visible object may be identified by parsing the converted ED in response to the request (STEP 250). As discussed above, the converted ED may be in PDF. In such embodiments, any rendering data of visible objects may be located within a visible layer of the converted ED.

In STEP 260, the attributes corresponding to the visible object are located within the metadata of the converted ED. As discussed above, the converted ED may be in PDF. In such embodiments, the metadata may be located in an invisible layer of the converted ED. The invisible layer and the visible layer may overlap. Moreover, the attributes of a visible object may be embedded in metadata located directly below or directly above the image of the visible object. Once located, these attributes may be extracted to generate the unconverted ED (described below).

In STEP 265, an unconverted ED is generated. The unconverted ED is generated by converting the converted ED from the second format (e.g., PDF) to the first format (e.g., OOXML). The conversion process may include restoring the visible objects in the first format using the attributed extracted from the metadata. In other words, the unconverted ED comprises the visible objects restored (i.e., recreated) in the first format using the attributes extracted from the metadata (STEP 260). Like the original ED, the unconverted ED includes the attributes of the visible object, and these attributes are used to create the visible object when the unconverted ED is rendered.

Figure 3A:
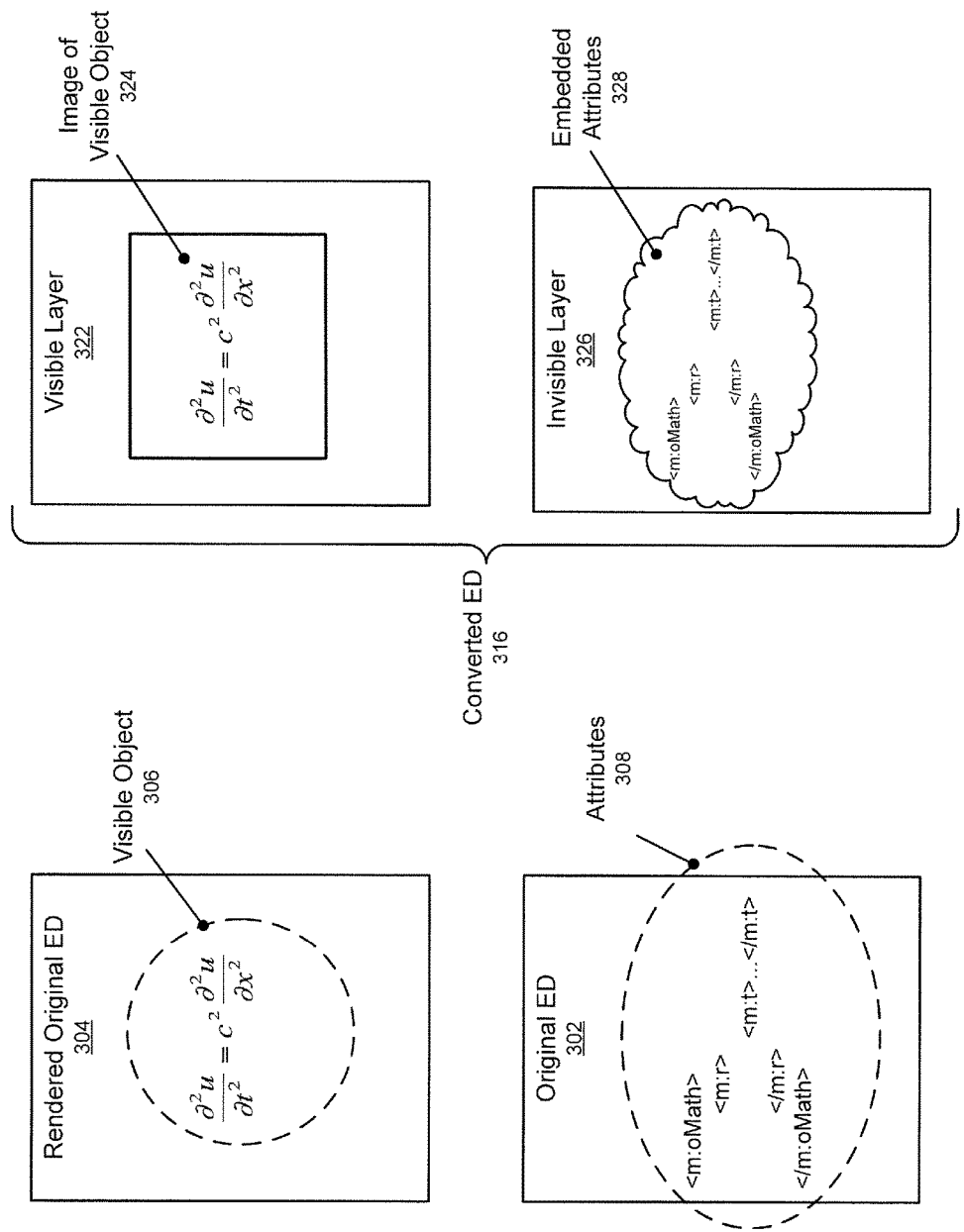
Figure 3B:
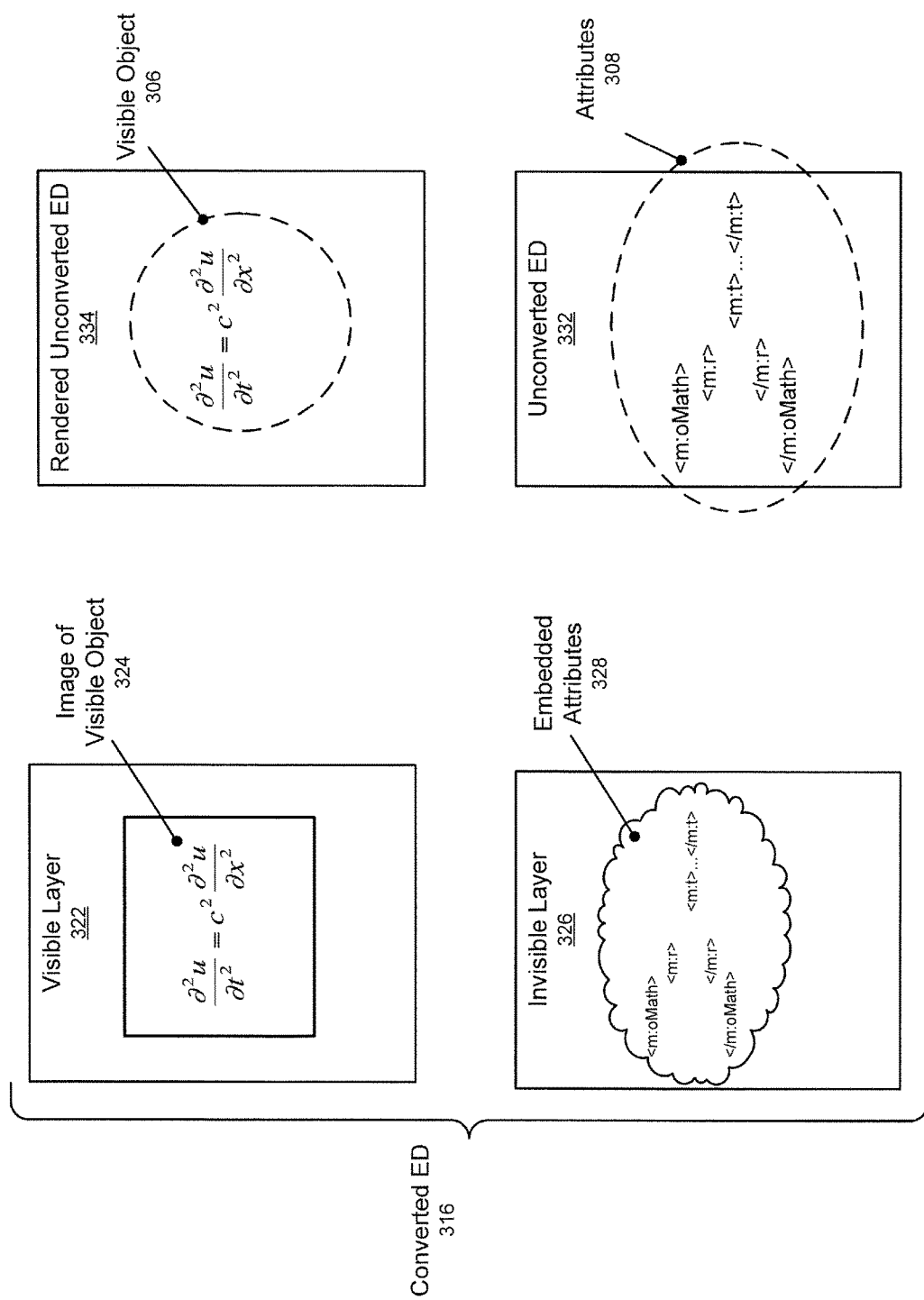

FIG. 3A and FIG. 3B show an example in accordance with one or more embodiments of the invention. As shown in FIG. 3A, there exists an original ED (302) in OOXML format. The original ED (302) has multiple attributes (308) specifying a visible object. Specifically, the multiple attributes specify an equation object and the multiple attributes are recorded in tags. When the original ED (302) is rendered (i.e., Rendered Original ED (304)), the visible object (306) is created from the attributes (308) and is visible to the user.

Still referring to FIG. 3A, assume a request is received to convert the original ED (302) from OOXML to PDF. In response to the request, the converted ED (316) is generated. The converted ED (316) has a visible layer (322) and an invisible layer (326) that overlap, with the visible layer (322) on top of the invisible layer (326). The conversion process includes generating rendering data of the visible object (324) and placing it within the visible layer (322) of the converted ED (316). For instance, an image file of the visible object (324), such as GIFF, TIFF, JPEG, and so on, is generated as the rendering data and is placed in the visible layer (322) of the converted ED (316). The attributes (308) are embedded in metadata within the invisible layer (326) of the converted ED (316). Moreover, the embedded attributes (328) are positioned within the invisible layer (326) beneath the image of the visible object (324) within the visible layer (322). Or, instead of or in addition to using the physical location, the embedded attributes (328) may be associated with the visible object (324) by providing a table in the converted ED (316). Although the converted ED (316) includes the embedded attributes (328), it is the rendering data of the visible object (324) that are needed to render the converted ED (316). In other words, the embedded attributes (328) are not needed to render the converted ED (316). It should be appreciated that the rendering data of the visible object (324) in the second format is not necessarily in a format of an image file as far as the rendering data is grammatically native to the second format so that an image of the visible object (324) can be rendered from the converted ED (316).

Now referring to FIG. 3B, at some future point, a request is received to convert the converted ED (316) from PDF back to OOXML. In response to the request, the unconverted ED (332) is generated. During the conversion process, in response to identifying the rendering data of the visible object (324), the corresponding embedded attributes (328) are located in the invisible layer (326). These embedded attributes (328) are used to restore (i.e., recreate) the visible object (306) in OOXML. As shown in FIG. 3B, the unconverted ED (322), like the original ED (302), includes the attributes (308). Moreover, the attributes (308) are required to create the visible object (306) when the unconverted ED (332) is rendered (i.e., Rendered Unconverted ED (334)).

Figure 3C:
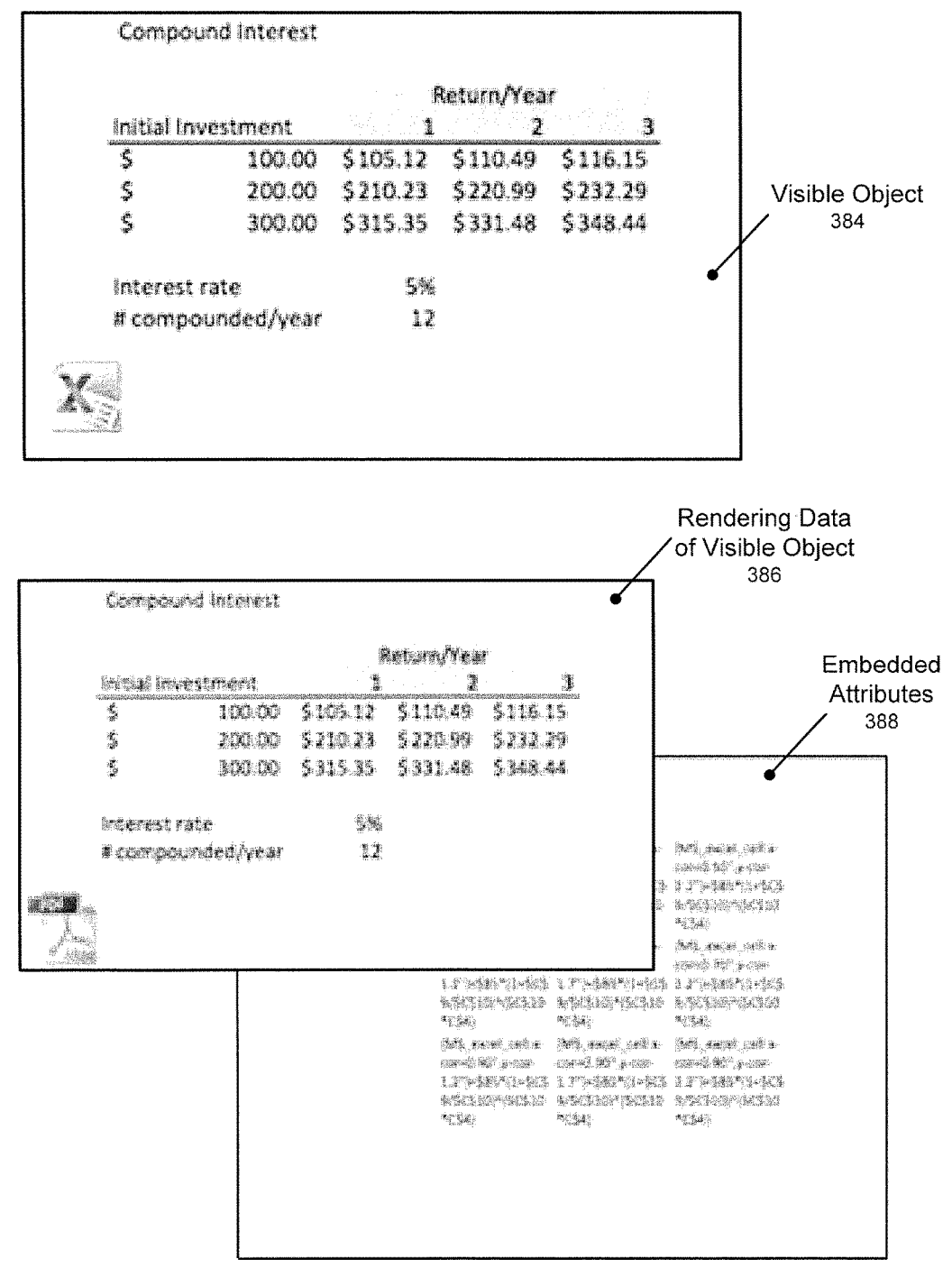

Although the example(s) in FIG. 3A and FIG. 3B has focused on a visible object that is an equation object, those skilled in the art, having the benefit of this detailed description, will appreciate that that the cells of a spreadsheet may also be a visible object(s). FIG. 3C shows an example in accordance with one or more embodiments of the invention. As shown in FIG. 3C, there exists a visible object (384) that corresponds to a spreadsheet with cells. Assume this visible object (384) exists in an original ED. The original ED would include attributes needed to create the visible object (384) when the original ED is rendered. Specifically, these attributes may include the equations/formulas in each cell that are used to calculate the value of the cell, the number of rows, the number of columns, the height and widths of the rows and columns, etc.

Still referring to FIG. 3C, assume a request is received to convert the original ED having the visible object (384) from OOXML to PDF. In response to the request, a converted ED is generated. During the conversion process, rendering data of the visible object (386) is created and placed within the visible layer of the converted ED. In this particular example, the rendering data may include text data of the value to be displayed in the cell and the font and style data designed in the cell. Moreover, the attributes of the visible object (384) are extracted from the original ED and embedded in the metadata of the converted ED. In this particular example, the metadata of the visible object may include tags related to the equations/formulas in the cell. It is the rendering data of the visible object (386), not the embedded attributes (388), that are used to render the converted ED. However, the embedded attributes (388) may be used at a future point to restore the visible objects in the OOXML format (e.g., in response to a request to convert the converted ED from PDF back to OOXML).

Embodiments of the invention may have one or more of the following advantages: the ability to restore a visible object in its original format from a converted ED that is in a different format; the ability to embed attributes of a visible object in metadata of the converted ED; the ability to use the invisible layer to store the attribute embedded metadata below or above rendering data of visible objects, the ability to improve the experience of a user viewing the unconverted ED; etc.

Figure 4:
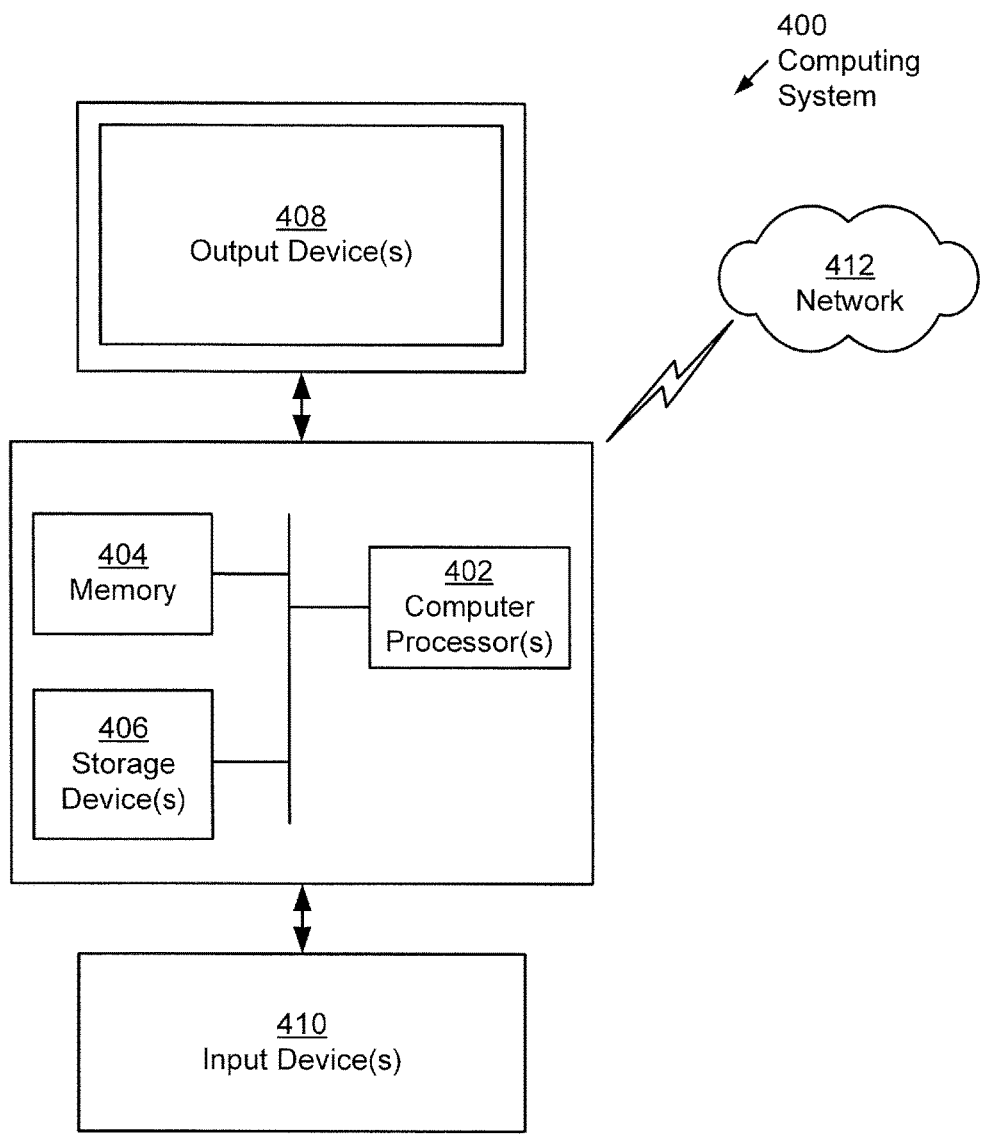
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing electronic documents (EDs), comprising:
    receiving a first request to convert an original ED comprising spreadsheet cells from a first format to a second format;
    extracting, in response to the first request, multiple sets of equations in the original ED respectively specifying and corresponding to the spreadsheet cells and required to restore the spreadsheet cells in the first format;
    rendering data of the spreadsheet cells, based on one or more of the multiple sets of equations, into one or more visible objects native to the second format;
    generating metadata comprising one or more of the multiple sets of equations and one or more embedded attributes of the multiple sets of equations;
    associating the metadata with the one or more visible objects, wherein the metadata is not needed to render the one or more visible objects in the second format; and
    generating, by converting the original ED from the first format to the second format, a converted ED comprising: the one or more visible objects and the metadata, wherein the first format is Office Open XML (OOXML) and the second format is portable document format (PDF).

2. The method of claim 1, further comprising:
    receiving a second request to convert the converted ED from the second format to the first format;
    identifying, during a parsing of the converted ED triggered by the second request, the rendering data;
    locating, in response to identifying the rendering data, the multiple sets of equations in the metadata of the converted ED; and
    generating, by converting the converted ED from the second format to the first format, an unconverted ED comprising the spreadsheet cells restored using the multiple sets of equations extracted from the metadata.

3. The method of claim 1, wherein the converted ED comprises a visible layer comprising the rendering data of the spreadsheet cells including the one or more visible objects and an invisible layer comprising the metadata, wherein the visible layer overlaps with the invisible layer, and wherein the location of the rendering data of the spreadsheet cells in the visible layer is at least one selected from a group consisting of above the multiple sets of equations in the invisible layer and below the multiple sets of the equations in the invisible layer.

4. A method for managing electronic documents (EDs), comprising:
    receiving a first request to convert an original ED comprising an equation object in a markup of the original ED from a first format to a second format;
    extracting, in response to the first request, an attribute in the original ED specifying the equation object and required to restore the equation object in the first format, wherein the attribute comprises at least one of parameters used in the equation object, variables used in the equation object, and operators of the equation object, and wherein the attribute is specified using a tag in the markup of the original ED;
    rendering the equation object into one or more visible objects native to the second format, wherein the attribute is not necessary to render the one or more visible objects in the second format;
    generating metadata comprising the attribute extracted from the markup of the original ED;
    associating the attribute with the one or more visible objects; and
    generating, by converting the original ED from the first format to the second format, a converted ED comprising: the one or more visible objects and the metadata, wherein the first format is Office Open XML (OOXML) and the second format is portable document format (PDF).

5. The method of claim 4, further comprising:
    receiving a second request to convert the converted ED from the second format to the first format;
    identifying, during a parsing of the converted ED triggered by the second request, the rendering data;

locating, in response to identifying the rendering data, the attribute in the metadata of the converted ED; and generating, by converting the converted ED from the second format to the first format, an unconverted ED comprising the equation object restored using the attribute extracted from the metadata.

6. The method of claim 4, wherein the converted ED comprises a visible layer comprising the rendering data of the equation object including the one or more visible objects and an invisible layer comprising the metadata, wherein the visible layer overlaps with the invisible layer, and wherein the location of the rendering data of the equation object in the visible layer is at least one selected from a group consisting of above the attribute in the invisible layer and below the attribute in the invisible layer.

7. A non-transitory computer readable medium (CRM) storing computer program code executed by a computer processor that:

receives a first request to convert an original electronic document (ED) comprising spreadsheet cells from a first format to a second format;

extracts, in response to the first request, multiple sets of equations in the original ED respectively specifying and corresponding to the spreadsheet cells and required to restore the spreadsheet cells in the first format;

renders data of the spreadsheet cells, based on one or more of the multiple sets of equations, into one or more visible objects native to the second format;

generates metadata comprising one or more of the multiple sets of equations and one or more embedded attributes of the multiple sets of equations;

associates the metadata with the one or more visible objects, wherein the metadata is not needed to render the one or more visible objects in the second format; and generates, by converting the original ED from the first format to the second format, a converted ED comprising: the one or more visible objects and the metadata, wherein the first format is Office Open XML (OOXML) and the second format is portable document format (PDF).

8. The non-transitory CRM of claim 7, further storing computer program code executed by the computer processor that:

receives a second request to convert the converted ED from the second format to the first format;

identifies, during a parsing of the converted ED triggered by the second request, the rendering data;

locates, in response to identifying the rendering data, the multiple sets of equations in the metadata of the converted ED; and generates, by converting the converted ED from the second format to the first format, an unconverted ED comprising the spreadsheet cells restored using the multiple sets of equations extracted from the metadata.

9. The non-transitory CRM of claim 7, wherein the converted ED comprises a visible layer comprising the rendering data of the spreadsheet cells including the one or more visible objects and an invisible layer comprising the metadata, wherein the visible layer overlaps with the invisible layer, and wherein the location of the rendering data of the spreadsheet cells in the visible layer is at least one selected from a group consisting of above the multiple sets of equations in the invisible layer and below the multiple sets of the equations in the invisible layer.

10. A non-transitory computer readable medium (CRM) storing computer program code executed by a computer processor that:

receives a first request to convert an original electronic document (ED) comprising an equation object in a markup of the original ED from a first format to a second format;

extracts, in response to the first request, an attribute in the original ED specifying the equation object and required to restore the equation object in the first format, wherein the attribute comprises at least one of parameters used in the equation object, variables used in the equation object, and operators of the equation object, and wherein the attribute is specified using a tag in the markup of the original ED;

renders the equation object into one or more visible objects native to the second format wherein the attribute is not necessary to render the one or more visible objects in the second format;

generates metadata comprising the attribute extracted from the markup of the original ED;

associates the attribute with the one or more visible objects; and generates, by converting the original ED from the first format to the second format, a converted ED comprising: the one or more visible objects and the metadata, wherein the first format is Office Open XML (OOXML) and the second format is portable document format (PDF).

11. The non-transitory CRM of claim 10, further storing computer program code executed by the computer processor that:

receives a second request to convert the converted ED from the second format to the first format;

identifies, during a parsing of the converted ED triggered by the second request, the rendering data;

locates, in response to identifying the rendering data, the attribute in the metadata of the converted ED; and generates, by converting the converted ED from the second format to the first format, an unconverted ED comprising the equation object restored using the attribute extracted from the metadata.

12. The non-transitory CRM of claim 10, wherein the converted ED comprises a visible layer comprising the rendering data including the one or more visible objects of the equation object and an invisible layer comprising the metadata, wherein the visible layer overlaps with the invisible layer, and wherein the location of the rendering data of the equation object in the visible layer is at least one selected from a group consisting of above the attribute in the invisible layer and below the attribute in the invisible layer.

* * * * *